United States Patent

Yamazaki

[11] 3,992,081
[45] Nov. 16, 1976

[54] LIQUID CRYSTAL DISPLAY DEVICE WITH ENHANCED CONTRAST

[75] Inventor: Yoshio Yamazaki, Suwa, Japan

[73] Assignee: Kabushiki Kaisha Suwa Seikosha, Tokyo, Japan

[22] Filed: Sept. 13, 1974

[21] Appl. No.: 505,875

Related U.S. Application Data

[63] Continuation-in-part of Ser. No. 254,575, May 18, 1972, abandoned, which is a continuation-in-part of Ser. No. 43,150, June 3, 1970, abandoned.

[30] Foreign Application Priority Data

June 11, 1969 Japan.................. 44-45580
July 4, 1969 Japan.................. 44-52680
July 15, 1969 Japan.................. 44-55570

[52] U.S. Cl. ........................................... 350/160 LC
[51] Int. Cl.² ........................................... G02F 1/13
[58] Field of Search ........................... 350/160 LC

[56] References Cited
UNITED STATES PATENTS

| | | |
|---|---|---|
| 3,499,112 | 3/1970 | Heilmeier et al. ......... 350/160 LC X |
| 3,653,138 | 4/1972 | Cooper ..................... 350/160 LC X |
| 3,701,249 | 10/1972 | Bergey et al. ............. 350/160 LC X |
| 3,712,047 | 1/1973 | Girard ..................... 350/160 LC X |
| 3,748,018 | 7/1973 | Borden ..................... 350/160 LC |
| 3,768,887 | 10/1973 | Portmann ................... 350/160 LC |
| 3,811,751 | 5/1974 | Myer ....................... 350/160 LC |
| 3,881,807 | 5/1975 | Hosokawa et al. ........... 350/160 LC |

*Primary Examiner*—Edward S. Bauer
*Attorney, Agent, or Firm*—Blum, Moscovitz, Friedman & Kaplan

[57] ABSTRACT

The contrast and thereby the visibility of indicia on a liquid crystal display device are enhanced by placing a film on said device in a position to reflect scattered light and by the use of a suitably placed shield to prevent specular reflection of incident light to the eye of the observer.

6 Claims, 5 Drawing Figures

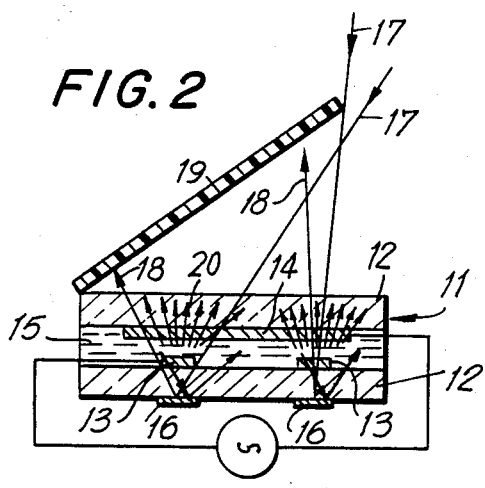
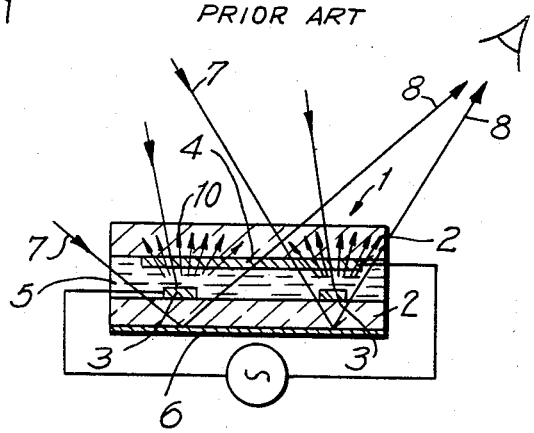
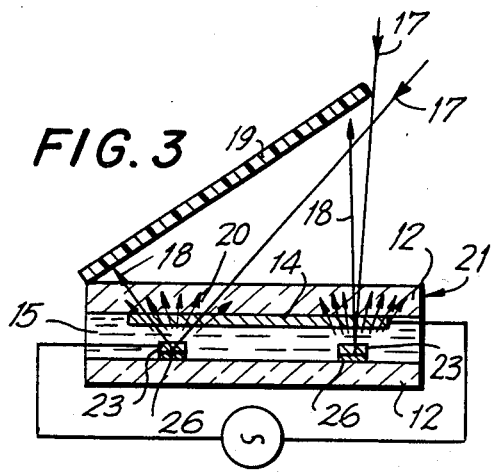
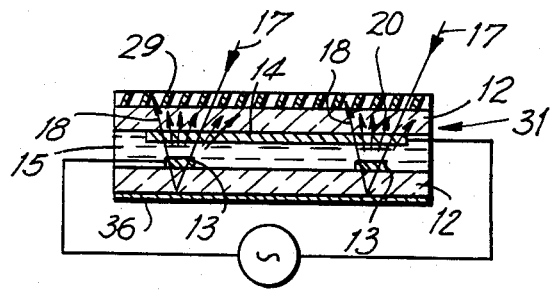
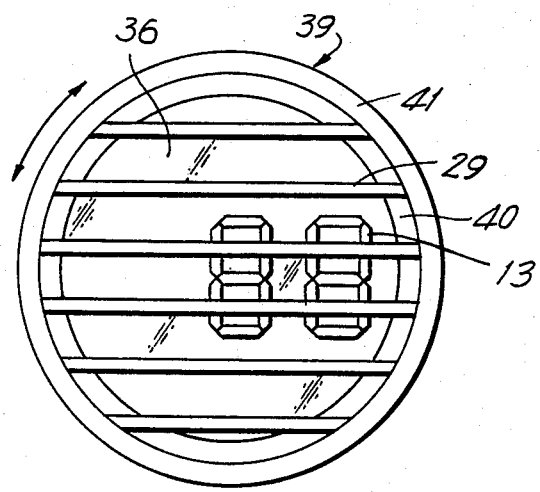

LIQUID CRYSTAL DISPLAY DEVICE WITH ENHANCED CONTRAST

CROSS REFERENCE TO RELATED APPLICATIONS

This application is a Continuation-In-Part of my copending application Ser. No. 254,575, filed May 18, 1972, the latter being a Continuation-In-Part of Ser. No. 43,150, filed June 3, 1970 both of said parent applications now being abandoned.

BACKGROUND OF THE INVENTION

The use of electrical of electronic liquid crystal display devices for showing characters, and in particular, numbers is already well-known. Such devices besides being compart, rapid in operation and relatively inexpensive have the advantage that the characters displayed are rendered visible by incident light so that no special light source is needed, and furthermore, the characters are visible in a brightly lit room.

Since characters on a liquid crystal display device are rendered visible by incident light, where the ambient light level is low, it is desirable that steps be taken to enhance the visibility of such characters. One method that has been used is to make the rear plate of the display device of a reflective metal. Another similar method has been to make the segmented electrodes of a reflective metal and to place the segmented electrodes on the interior surface of the rear plate of the display device. Both of these arrangements suffer from the problem that if any trace of moisture is present in the liquid crystal material itself then electro-chemical reactions can proceed which may result in the degradation of the reflectance of the electrodes, even to the point where they are completely non-reflective. The electro-chemical process which is particularly to be feared is the electrolysis of moisture to produce oxygen which may react with the surface of the metal forming a non-reflective oxide.

Heilmeier et al. in U.S. Pat. No. 3,499,112 have disclosed a display device in which the entire rear surface of the display device is reflective. However, they recommend that a collimated beam be used for illuminating the device and that the beam strike the device at such an angle that there will be no direct reflection to the eye of the observer. The invention of Heilmeier et al is designed for the display of only a single point at any given instant. Needless to say, direct reflection from the remainder of the unactivated portion of the device would make it extremely difficult to discern the isolated point being activated.

SUMMARY OF THE INVENTION

A liquid crystal display device includes opposed top and bottom transparent insulating plates, each having on the interior surface thereof a transparent conductive film, at least one of which is segmented. The plates are separated by a spacer which, together with the plates, forms a sealed volume. The volume is filled with nematic liquid crystal material. Each individual segment of conductive film on the interior of the plates is connectable to a voltage source. In order to increase the visibility of characters formed by the conductive segments, a segmented reflective film in one embodiment of the invention is formed on the bottom surface of the device, each reflective segment being in registry with a conductive segment on the interior faces of the plates. Where the conductive segments are in strip form having hollow interiors, the reflective segments are of the same shape. The reflective segments may be of nickel, silver or aluminum.

In all embodiments of the invention a hood or shield constitutes part of the display device and is so positioned that incident light falling upon the reflective film cannot be specularly reflected into the eye of the observer.

In a second embodiment of the invention the reflective film is placed between the transparent conductive film on the interior surface of the bottom plate and the bottom plate itself. In a third embodiment, the reflective film covers either the inside or outside surface of the bottom plate.

The hood or shield may be in one piece or may consist of a plurality of pieces in the form of louvers.

Accordingly, an object of the present invention is to provide an improved liquid crystal display device wherein the contrast and visibility of characters displayed on said display device is enhanced through the use of a shield.

Another object of the present invention is to provide an improved liquid crystal display device wherein the visibility of characters on said display device is enhanced by the use of a reflective coating on the rear of said device in combination with a shield.

A further object of the present invention is to provide an improved liquid crystal display device wherein segmented electrodes are used for the display of characters and a reflective film is disposed at the rear surface of the device, said reflective film being segmented and the segments being in registry with the segments of the segmented electrode.

Still another object of the present invention is to provide an improved liquid crystal display device wherein the visibility of characters displayed thereon is enhanced by means of a reflective film at the rear surface of said device, said reflective film being of aluminum, nickel or silver and specularly reflected light being prevented from reaching the viewer.

A particularly important object of the present invention is to provide an improved liquid crystal display device wherein the contrast and visibility of characters displayed thereon is enhanced through the use of a shield or hood for preventing specular reflection of incident light from a reflective film to the eye of an observer.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a cross-sectional view of a liquid crystal display device in accordance with the prior art;

FIG. 2 is a cross-sectional view of an embodiment of the present invention;

FIG. 3 is a cross-sectional view of a second embodiment of the present invention;

FIG. 4 is a cross-sectional view of a third embodiment of the present invention in which a shield is utilized in the form of louvers; and FIG. 5 is a plan view of an embodiment of the present invention using louvers as a shield, the louvers being mounted on a rotatable bezel on a wrist watch.

DESCRIPTION OF THE PREFERRED EMBODIMENTS

A liquid crystal in accordance with the prior art is shown in FIG. 1 and is designated generally by the reference numeral 1. The device includes top and bottom glass plates 2, transparent conductive segments 3 on the interior surface of glass plate 2, transparent conductive film 4 on the interior surface of upper plate 2, liquid crystal material 5 between glass plates 2 and reflective film 6 on the rear surface of the bottom glass plate. The conductive segments are connectable to an exterior source of voltage as indicated. In use, incident light 7 may be specularly reflected as light rays 8 to the eye of an observer. Where the liquid crystal device operates in the dynamic scattering mode, light incident on the crystal material between the film 4 and segments 3 is scattered, and some of this scattered light also reaches the eye. However, the contrast of the system and hence the legibility of indicia formed by said segments is decreased due to the fact that some of the incident light is specularly reflected to the eye.

An embodiment of the present invention is shown in FIG. 2 where the reference numeral 11 generally indicates a liquid crystal display device. In this case, the liquid crystal cell includes top and bottom glass plates 12, conductive film 14 on the interior surface of the upper plate and segmented, transparent conductive films 13 on the interior surface of the bottom plate. In a preferred form, reflective film 16 on the bottom surface of the bottom plate is segmented; the segments lie in registry with segments 13 on the upper surface of the bottom plate.

Incident light rays are prevented by shield or hood 19 from being specularly reflected by segmented mirrors 16 to the eye of an observer as indicated by incident light ray 17 reflected as light rays 18 and intercepted by hood 19, which preferably is of a strongly absorptive material such as a black plastic or a metal, the interior surface of which is painted or otherwise rendered black. In this embodiment, only the light scattered by liquid crystal material 15 when a voltage is imposed across the liquid crystal cell can reach the eye of an observer. As a result, contrast and legibility are enhanced both by the absence of specularly reflected light and the presence of the mirrors 16 which reinforce scattered light 20.

A second embodiment of the invention is shown in FIG. 3 in which segmented mirrors 26 are placed immediately between transparent, conductive films 23 and bottom glass plate 12. In this arrangement bottom plate 12 can be opaque. Also, reflective film 26, which may be of aluminum, nickel or silver may function as the conductive segment to be energized from an external source of voltage. As before, incident light rays when specularly reflected as light rays 18 from mirror segments 26 are intercepted by hood 19. Consequently, only scattered light 20 can reach the eye of an observer.

Another embodiment of the invention is shown in FIG. 4, the embodiment being indicated generally by the reference numeral 31. In this case a reflective film 36 is shown as covering the entire bottom surface of the bottom plate 12. However, as will become evident, either of the types of reflective films shown in the embodiments of FIGS. 2 and 3 could equally well be used.

The distinguishing feature of the embodiment of FIG. 4 is the arrangement of the hood in the form of louvers 27. The louvers are tipped at an angle which corresponds to the direction from which it is anticipated that the diplay will be viewed. Again, the cell includes upper and lower glass plates 12, transparent conductive segments 13 on the interior surface of the lower glass plate and transparent conductive film 14 on the interior surface of the upper glass plate 12, and liquid crystal material 15 between the plates 12, the liquid crystal material being of the type which functions in the dynamic scattering mode; transparent conductive films 13 and 14 are connectable to an exterior source of voltage so that a voltage may be impressed acorss the liquid crystal material in the cell. Rays of incident light indicated by the reference numeral 17 are specularly reflected from reflective film 36 as rays 18 which are intercepted by louvers 29. However, light scattered by liquid crystal material 15 can pass between the louvers to be viewed by an observer, the contrast of the display beinng enhanced by the use of mirror 36 to reflect backwardly scattered light and the absence of specularly reflected light from incident rays.

The louvers may be mounted in a variety of ways. In FIG. 4 the louvers which are of light-absorptive material or faced with light-absorptive material are regarded as being molded into a plastic assembly. Another arrangement is shown in FIG. 5 in which louvers 29 are mounted on rotatable bezel 40 which rides on watch case 41, the assembly being indicated by the reference numeral 39. Indicia 13 are visible between the louvers. Bezel 40 is rotatable as indicated by the double headed curved arrow to give the optimum contrast, depending upon the direction of incident light in the region in which the device is to be used and on the direction from which it is to be viewed.

Tests have shown that there is a definite but not great advantage in shaping the reflective film to correspond to the indicia, the visibility of which is to be enhanced. For this purpose, of course, the shaped mirror must be placed in registration with said indicia. However, where the question of economy in manufacture arises, it may be preferred to coat essentially the entire bottom surface of the bottom plate with a reflective film. As aforenoted, suitable reflective film materials are nickel, silver and aluminum.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. In a liquid crystal display device having an upper and a lower plate each having a liquid crystal material between a conductive electrode thereon with the electrode on the lower plate being segmented in the form of characters and wherein a mirror surface is positioned behind and only behind each conductive segment on said lower plate to reflect light reaching said lower plate, the improvement comprising a shield so positioned with respect to said device as to intercept incident light specularly reflected by said mirror surface.

2. The improvement as defined in claim 1, wherein the surface of said shield which intercepts specularly reflected light is highly absorptive of light.

3. The improvement as defined in claim 1, wherein said shield is adjustable with respect to the direction of incident light.

4. The improvement as defined in claim 1, wherein said shield is in the form of louvers.

5. The improvement as defined in claim 1, wherein said liquid crystal display device is incorporated in a timepiece.

6. The improvement as defined in claim 5, wherein said timepiece is a wrist watch.

* * * * *